US010717887B2

(12) United States Patent
Sugiura et al.

(10) Patent No.: US 10,717,887 B2
(45) Date of Patent: *Jul. 21, 2020

(54) OIL-BASED INKJET INK

(71) Applicant: RISO KAGAKU CORPORATION, Tokyo (JP)

(72) Inventors: Hikaru Sugiura, Ibaraki (JP); Shinichiro Shimura, Ibaraki (JP); Marie Morinaga, Ibaraki (JP); Kazuyuki Ando, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/904,496

(22) Filed: Feb. 26, 2018

(65) Prior Publication Data

US 2018/0244939 A1     Aug. 30, 2018

(30) Foreign Application Priority Data

Feb. 28, 2017 (JP) .................. 2017-035942
Sep. 28, 2017 (JP) .................. 2017-188373

(51) Int. Cl.
| C09D 11/36 | (2014.01) |
| C09D 11/033 | (2014.01) |
| C09D 11/037 | (2014.01) |
| C09D 11/102 | (2014.01) |
| C09D 11/322 | (2014.01) |
| C09D 11/324 | (2014.01) |
| C09D 11/326 | (2014.01) |

(52) U.S. Cl.
CPC ............ *C09D 11/36* (2013.01); *C09D 11/033* (2013.01); *C09D 11/037* (2013.01); *C09D 11/102* (2013.01); *C09D 11/322* (2013.01); *C09D 11/324* (2013.01)

(58) Field of Classification Search
CPC ........ C09D 11/36; C09D 11/322; C09D 11/30
See application file for complete search history.

(56) References Cited

U.S. PATENT DOCUMENTS

| 4,338,133 A | 7/1982 | Toyoda |
| 5,968,244 A | 10/1999 | Ueda et al. |
| 5,980,624 A | 11/1999 | Ichikawa et al. |
| 6,113,679 A * | 9/2000 | Adkins ................. C09D 11/36 |
| | | 106/31.6 |
| 7,834,072 B2 | 11/2010 | Carlini et al. |
| 8,038,784 B2 | 10/2011 | Watanabe et al. |
| 8,440,010 B2 | 5/2013 | Endo |
| 8,507,585 B2 | 8/2013 | Hosoya et al. |
| 9,624,394 B2 | 4/2017 | Endo et al. |
| 9,624,402 B2 | 4/2017 | Shimura et al. |
| 9,821,568 B2 | 11/2017 | Shimura |
| 9,845,402 B2 | 12/2017 | Shimura et al. |
| 2003/0220418 A1 | 11/2003 | Horie et al. |
| 2004/0063811 A1 * | 4/2004 | Horie ................. C09D 11/36 |
| | | 523/160 |
| 2004/0068031 A1 | 4/2004 | Horie |
| 2004/0265756 A1 * | 12/2004 | Horie ................. C08G 77/442 |
| | | 430/434 |
| 2005/0046675 A1 | 3/2005 | Aoshima |
| 2005/0119363 A1 | 6/2005 | Yamada et al. |
| 2006/0189712 A1 | 8/2006 | Kondo |
| 2007/0022904 A1 | 2/2007 | Kitawaki et al. |
| 2008/0194754 A1 | 8/2008 | Nakamura |
| 2009/0090271 A1 * | 4/2009 | Wynants .............. C09D 11/101 |
| | | 106/31.78 |
| 2009/0263632 A1 | 10/2009 | Kojima et al. |
| 2010/0136234 A1 | 6/2010 | Kobayashi |
| 2012/0006225 A1 | 1/2012 | Tsukiana et al. |
| 2012/0048141 A1 | 3/2012 | Arai et al. |
| 2018/0244936 A1 | 8/2018 | Shimura et al. |
| 2018/0244937 A1 | 8/2018 | Sugiura et al. |
| 2018/0244938 A1 | 8/2018 | Morinaga et al. |
| 2018/0244939 A1 | 8/2018 | Sugiura et al. |
| 2018/0244940 A1 | 8/2018 | Ando et al. |
| 2018/0244941 A1 | 8/2018 | Sugiura et al. |
| 2018/0327617 A1 | 11/2018 | Inoue et al. |
| 2019/0100002 A1 | 4/2019 | Ozawa |
| 2019/0100668 A1 | 4/2019 | Ando |
| 2019/0100671 A1 | 4/2019 | Morinaga |
| 2019/0134989 A1 | 5/2019 | Matsumoto et al. |

(Continued)

FOREIGN PATENT DOCUMENTS

| AU | 2012247077 B2 | 11/2012 |
| EP | 1493783 A1 | 1/2005 |
| EP | 3093316 A1 | 11/2016 |

(Continued)

OTHER PUBLICATIONS

European Search Report issued with respect to Application No. 18158552.2, dated May 17, 2018.
European Search Report issued with respect to Application No. 18158568.8, dated May 24, 2018.
European Search Report issued with respect to Application No. 18158557.1, dated May 24, 2018.
European Search Report issued with respect to Application No. 18158565.4, dated Jun. 1, 2018.
European Search Report issued with respect to Application No. 18158577.9, dated Jun. 21, 2018.

(Continued)

*Primary Examiner* — Helene Klemanski

(74) *Attorney, Agent, or Firm* — Greenblum & Bernstein, P.L.C.

(57) ABSTRACT

An oil-based inkjet is disclosed, the oil-based inkjet ink containing a pigment, a pigment dispersant and a non-aqueous solvent, wherein the non-aqueous solvent contains a silicone oil having a surface tension of at least 19.0 mN/m but less than 24.0 mN/m and a polar solvent having a surface tension of at least 27.0 mN/m, and a surface tension of the ink is at least 23.0 mN/m but less than 27.0 mN/m.

9 Claims, No Drawings

(56) References Cited

U.S. PATENT DOCUMENTS

| 2019/0300737 | A1 | 10/2019 | Ozawa |
| 2020/0040206 | A1 | 2/2020 | Sugiura |

FOREIGN PATENT DOCUMENTS

| EP | 3 366 737 | | 8/2018 |
| EP | 3 366 739 | | 8/2018 |
| JP | 01203482 | A | 8/1989 |
| JP | H03-292370 | A | 12/1991 |
| JP | H04-161467 | A | 6/1992 |
| JP | H04-248879 | A | 9/1992 |
| JP | 2001-098196 | A | 4/2001 |
| JP | 2001-342388 | | 12/2001 |
| JP | 2004-217703 | A | 8/2004 |
| JP | 2005-60567 | A | 3/2005 |
| JP | 2006-307107 | A | 11/2006 |
| JP | 2006-315363 | A | 11/2006 |
| JP | 2007-154149 | A | 6/2007 |
| JP | 2010001452 | | 1/2010 |
| JP | 2010/064478 | | 3/2010 |
| JP | 2014-19766 | A | 2/2014 |
| JP | 2016-196564 | A | 11/2016 |

OTHER PUBLICATIONS

European Search Report issued with respect to Application No. 18158573.8, dated Jul. 18, 2018.
Official Communication issued in European Patent Office (EPO) Patent Application No. 18 158 557.1, dated Sep. 5, 2019.
English translation of JP-01203482-A, dated Aug. 1989; 6 pages.
Apr. 7, 2020 Office Action in copending U.S. Appl. No. 15/904,476, filed Feb. 26, 2018.
English translation of JP 2006/307107, dated Nov. 2006; 28 pages.
English translation of JP 2016/196564, dated Nov. 2016; 29 pages.
English translation of JP 2001/098196, dated Apr. 2001; 12 pages.
English translation of JPH 03/292370, dated Dec. 1991; 6 pages.
Reactive and Non-Reactive Silicone Fluid from Shin-Etsu Chemical Co. Ltd., shinetsusilicone-global.com/catalog/pdf/modified_e.pdf; 2006; 10 pages.
"Phenyl Methyl Silicon Fluid" www.organosilicon.com/en/68083-14-7.htm, no date available; 1 page.
Mar. 11, 2020 Office Action in copending U.S. Appl. No. 15/904,478, filed Feb. 26, 2018.
"Silicone Fluid KF-96" from Shin-Etsu Chemical Co., Ltd.; shinetsusilicone-global.com/catalog/pdf/kf96_e.pdf. 2004; 36 pages.
Apr. 9, 2020 Office Action in copending U.S. Appl. No. 15/904,481, dated Feb. 26, 2018.
Apr. 13, 2020 Office Action in copending U.S. Appl. No. 15/904,504, dated Feb. 26, 2018.
English translation of JP 2004/217703, dated Aug. 2004; 9 pages.
Apr. 13, 2020 Office Action in copending U.S. Appl. No. 15/904,508, dated Feb. 26, 2018.
Apr. 15, 2020 Office Action in copending U.S. Appl. No. 16/141,054, dated Sep. 25, 2018.
Extended European Search Report from European Patent Office (EPO) in European Patent Appl. No. 18192237.8, dated Mar. 14, 2019.
English translation of JPH 04/248879, dated Sep. 1992; 13 pages.
Apr. 15, 2020 Office Action in copending U.S. Appl. No. 16/141,003, dated Sep. 25, 2018.
English translation of JP 2010/064478, dated Mar. 2010; 40 pages.
"Development of a Three-Dimensional Bioprinter: Construction of a Cell Supporting Structures Using Hydrogel and State-Of-The-Art Inkjet Technology" by Nishiyama et al.; J. Biomechanical Engineering, 131(3): 035001, Mar. 2009; 6 pages.

\* cited by examiner

OIL-BASED INKJET INK

CROSS REFERENCE TO RELATED APPLICATIONS

This application is based upon and claims the benefit of priority from the prior Japanese Patent Application No. 2017-35942, filed on Feb. 28, 2017, the entire contents of which are incorporated by reference herein, and the prior Japanese Patent Application No. 2017-188373, filed on Sep. 28, 2017, the entire contents of which are incorporated by reference herein.

BACKGROUND OF THE INVENTION

Field of the Invention

The present invention relates to an oil-based inkjet ink.

Description of the Related Art

The inkjet recording method is a method in which an inkjet ink of high fluidity is jetted from fine nozzles in the form of liquid droplets, thereby recording an image on a recording medium positioned facing the nozzles, and because this method enables high-speed printing to be conducted with little noise, it has rapidly become widespread in recent years. Examples of known types of inks that can be used in this type of inkjet recording method include aqueous inks which contain water as the main solvent, ultraviolet-curable inks (UV inks) which contain a large amount of a polymerizable monomer as the main component, hot melt inks (solid inks) which contain a large amount of a wax as the main component, and so-called non-aqueous inks which contain a non-aqueous solvent as the main solvent. Non-aqueous inks can be classified into solvent-based inks in which the main solvent is a volatile organic solvent, and oil-based inks in which the main solvent is an organic solvent having either low volatility or no volatility. Solvent-based inks mainly dry on the recording medium as a result of evaporation of the organic solvent, whereas oil-based inks mainly dry as a result of penetration into the recording medium.

Oil-based inks containing a silicone oil have already been proposed.

JP 2004-217703 A proposes that by using an inkjet non-aqueous pigment ink containing a silicone-based solvent and a pigment, and also containing a specific modified silicone oil as a dispersant, the stability of the ink, and the levels of nozzle blockages and clear file deformation can all be improved.

JP H04-248879 A proposes that by using an inkjet recording ink containing at least 2 to 95 wt % of a silicone-based solvent with a boiling point of 100° C. to 250° C., and a colorant that is insoluble in the solvent, good print quality can be obtained regardless of the paper quality, satisfactory durability can be achieved several seconds after printing, and vivid images can be obtained with no color mixing in color images.

JP H04-161467 A proposes that by using an inkjet printer ink that uses an insulating solvent having a siloxane linkage in the molecular skeleton, high-density vivid printing is possible, the printed image has favorable rub fastness, and stable discharge can be achieved.

SUMMARY OF THE INVENTION

An embodiment of the present invention provides an oil-based inkjet ink containing a pigment, a pigment dispersant and a non-aqueous solvent, wherein the non-aqueous solvent contains a silicone oil having a surface tension of at least 19.0 mN/m but less than 24.0 mN/m and a polar solvent having a surface tension of at least 27.0 mN/m, and a surface tension of the ink is at least 23.0 mN/m but less than 27.0 mN/m.

DETAILED DESCRIPTION OF THE EMBODIMENTS

Embodiments of the present invention are described below, but the following embodiments in no way limit the present invention.

For printed items, a higher image density is usually desirable.

Further, it is also desirable to suppress the occurrence of show-through, a phenomenon wherein the printed image can be seen from the rear surface of the printed item through the recording medium.

Further, in inkjet printing, a portion of the ink discharged from the inkjet head can sometimes form a mist, and this ink mist may adhere to the recording medium or to interior components of the inkjet printer, contaminating the recording medium or the interior of the inkjet printer.

Furthermore, in inkjet printing, the ink on the recording medium can sometimes adhere to the surface of a roller in the inkjet printer, such as a drive roller or a driven roller, and this ink may then be transferred from the roller surface to a subsequently transported recording medium, causing transfer contamination (roller transfer contamination).

An object of the present invention is to provide an oil-based inkjet ink that can produce printed images having excellent image density, and can reduce the occurrence of show-through, mist generation and roller transfer contamination.

Embodiments of the present invention are described below, but the following embodiments in no way limit the present invention.

In the following description, the oil-based inkjet ink is sometimes referred to as simply "the ink".

An oil-based inkjet ink according to one embodiment contains a pigment, a pigment dispersant and a non-aqueous solvent, wherein the non-aqueous solvent contains a silicone oil having a surface tension of at least 19.0 mN/m but less than 24.0 mN/m and a polar solvent having a surface tension of at least 27.0 mN/m, and the surface tension of the ink is at least 23.0 mN/m but less than 27.0 mN/m.

This oil-based inkjet ink can produce printed images having excellent image density, and can reduce the occurrence of show-through, mist generation and roller transfer contamination.

The reasons for these effects are not constrained by any particular theory, but it is thought that the ink has the types of effects described below during the flight process when the discharged ink is in flight, the wet spreading process where the ink droplets spread across the recording medium, and the penetration process where the ink penetrates into the recording medium.

The surface tension of the ink tends to affect the generation of mist during the flight process of the discharged ink toward the recording medium, and the lower the surface tension of the ink, the more easily mist is generated. Further, if static electricity develops, then mist generation is more likely to occur. When the ink contains a polar solvent, static electricity development tends to be suppressed. Accordingly, it is thought that by ensuring that the surface tension of the ink is at least 23.0 mN/m, and that the ink contains a polar solvent, mist generation can be reduced.

When the ink hits the recording medium, the wet spreading process where the ink droplets spread across the recording medium and the penetration process where the ink penetrates into the recording medium lead to the formation of dots.

The surface tension of the ink tends to affect the wet spreading process, and the lower the surface tension of the ink, the more the dot diameter tends to spread. It is thought that by ensuring that the surface tension of the ink is less than 27.0 mN/m, a larger dot diameter can be obtained more easily, which makes it easier to fill the blank background and achieve a higher image density.

In the penetration process, the surface tension of the solvent tends to affect the penetration. It is thought that a low-surface tension silicone oil having a surface tension of less than 24.0 mN/m tends to penetrate rapidly, and, therefore, by using such a silicone oil, roller transfer contamination can be reduced.

On the other hand, if the solvent penetrates through to the rear surface of the recording medium such as a sheet of paper, then the recording medium is more likely to develop transparency, increasing the likelihood of show-through. By ensuring that the surface tension of the silicone oil is at least 19.0 mN/m, excessive penetration of the silicone oil can be suppressed. Further, because the polar solvent having a surface tension of at least 27.0 mN/m has a high surface tension, penetration of this solvent tends to be slow, and compared with the silicone oil, the polar solvent tends to exhibit better compatibility with the pigment dispersant. As a result, by using this polar solvent having a surface tension of at least 27.0 mN/m, the pigment and the dispersant tend to be more easily retained at the surface of the recording medium, together with the polar solvent. In this manner, it is thought that by using a silicone oil having a surface tension of at least 19.0 mN/m and a polar solvent having a surface tension of at least 27.0 mN/m, show-through can be reduced.

Further, as described above, because the surface tension of the ink is a low value of less than 27.0 mN/m, in the wet spreading process, the ink droplets that have hit the recording medium undergo a greater amount of wet spreading, making it easier to fill the blank background in the case of solid image formation. Moreover, as mentioned above, the polar solvent having a high surface tension makes it easier to retain the pigment at the surface of the recording medium such as the paper during the penetration process. As a result, it is thought that even in the case of solid image printing, a solid image having high image density can be printed with reduced show-through.

The surface tension of the ink and each of the solvents can be determined by the maximum bubble pressure method. For example, the surface tension can be measured using the Science Line t60 device manufactured by SITA Process Solutions of SITA Messtechnik GmbH.

The ink preferably contains a pigment as the colorant.

Organic pigments such as azo pigments, phthalocyanine pigments, polycyclic pigments and dye lake pigments, and inorganic pigments such as carbon blacks and metal oxides can be used as the pigment. Examples of the azo pigments include soluble azo lake pigments, insoluble azo pigments and condensed azo pigments. Examples of the phthalocyanine pigments include metal phthalocyanine pigments and metal-free phthalocyanine pigments. Examples of the polycyclic pigments include quinacridone-based pigments, perylene-based pigments, perinone-based pigments, isoindoline-based pigments, isoindolinone-based pigments, dioxazine-based pigments, thioindigo-based pigments, anthraquinone-based pigments, quinophthalone-based pigments, metal complex pigments and diketopyrrolopyrrole (DPP). Examples of the carbon blacks include furnace carbon black, lamp black, acetylene black and channel black. Examples of the metal oxides include titanium oxide and zinc oxide. These pigments may be used individually, or a combination of two or more pigments may be used.

The dispersed form of the pigment may be a dispersion in which a so-called encapsulated pigment in which the pigment is coated with an oil-insoluble resin, or colored resin particles are dispersed using a pigment dispersant, but a dispersion in which the pigment dispersant is adsorbed directly to the pigment surface is preferred.

From the viewpoints of discharge stability and storage stability, the average particle size of the pigment is preferably not more than 300 nm, more preferably not more than 200 nm, and even more preferably 150 nm or less.

The amount of the pigment is typically from 0.01 to 20% by mass of the total mass of the ink, and from the viewpoints of print density and ink viscosity, is preferably from 1 to 15% by mass, and more preferably from 5 to 10% by mass.

In order to ensure stable dispersion of the pigment in the ink, a pigment dispersant may be used together with the pigment.

Examples of pigment dispersants that can be used favorably include hydroxyl group-containing carboxylate esters, salts of long-chain polyaminoamides and high-molecular weight acid esters, salts of high-molecular weight polycarboxylic acids, salts of long-chain polyaminoamides and polar acid esters, high-molecular weight unsaturated acid esters, copolymers of vinylpyrrolidone and long-chain alkenes, modified polyurethanes, modified polyacrylates, polyether ester anionic surfactants, polyoxyethylene alkyl phosphate esters, and polyester polyamines.

Examples of commercially available pigment dispersants include Antaron V216 (a vinylpyrrolidone-hexadecene copolymer) and V220 (a vinylpyrrolidone-eicosene copolymer) (both product names), manufactured by ISP Japan Ltd.; Solsperse 13940 (a polyester amine-based dispersant), 16000, 17000 and 18000 (fatty acid amine-based dispersants), and 11200, 24000 and 28000 (all product names), manufactured by The Lubrizol Corporation; Efka 400, 401, 402, 403, 450, 451 and 453 (modified polyacrylates) and Efka 46, 47, 48, 49, 4010 and 4055 (modified polyurethanes) (all product names), manufactured by BASF Japan Ltd.; Disparlon KS-860 and KS-873N4 (polyester amine salts) (both product names), manufactured by Kusumoto Chemicals, Ltd.; Discol 202, 206, OA-202 and OA-600 (multichain polymeric nonionic dispersants) (all product names), manufactured by DKS Co., Ltd.; DISPERBYK 2155 and 9077 (both product names). manufactured by BYK-Chemie Japan K.K.; and Hypermer KD2, KD3, KD11 and KD12 (all product names), manufactured by Croda Japan K.K.

The amount of the pigment dispersant need only be sufficient to enable satisfactory dispersion of the pigment within the ink, and may be set as appropriate. For example, the pigment dispersant may be added in a mass ratio within a range from 0.1 to 5, and preferably from 0.1 to 1, relative to a value of 1 for the pigment. Further, the pigment dispersant is may be added in an amount of 0.01 to 10% by mass, and preferably from 0.01 to 5% by mass, relative to the total mass of the ink.

In the ink, the amount of resin components, including the pigment dispersant, relative to the total mass of the ink, is typically not more than 10% by mass, preferably not more than 7% by mass, and more preferably 5% by mass or less. This may prevent any increase in the ink viscosity, and improve the discharge performance.

The ink preferably contains a silicone oil having a surface tension of at least 19.0 mN/m but less than 24.0 mN/m.

The surface tension of the silicone oil is preferably at least 19.0 mN/m, and more preferably 20.0 mN/m or greater. This may enable better suppression of excessive penetration of the silicone oil into the recording medium, making it easier to reduce show-through.

The surface tension of the silicone oil is preferably less than 24.0 mN/m, and more preferably 23.0 mN/m or less. This may enable the silicone oil to penetrate rapidly, enabling roller transfer contamination to be reduced.

There are no particular limitations on the silicone oil, provided it has a surface tension that is at least 19.0 mN/m but less than 24.0 mN/m, and a compound having silicon atoms and carbon atoms in each molecule which is liquid at 23° C. can be used.

Compounds having a silyl group, compounds having a silyloxy group, and compounds having a siloxane linkage and the like can be used as the silicone oil, and polysiloxane compounds can be used particularly favorably.

A chain-like silicone oil, a cyclic silicone oil, or a modified silicone oil or the like may be used as the silicone oil.

The chain-like silicone oil is preferably a chain-like polysiloxane having 7 to 30 silicon atoms, more preferably 7 to 20 silicon atoms, and even more preferably 7 to 10 silicon atoms. Examples of the chain-like silicone oil include linear dimethyl silicone oils such as hexadecamethylheptasiloxane, and branched dimethyl silicone oils such as methyltris(trimethylsiloxy)silane and tetrakis(trimethylsiloxy)silane.

The cyclic silicone oil is preferably a cyclic polysiloxane of 5 to 9 silicon atoms, and cyclic dimethyl silicone oils such as decamethylcyclopentasiloxane, dodecamethylcyclohexasiloxane, hexadecamethylcyclooctasiloxane and octadecamethylcyclononasiloxane can be used favorably.

For the modified silicone oil, a silicone oil obtained by introducing any of various organic groups at a portion of the silicon atoms of a chain-like or cyclic dimethyl silicone oil can be used. In the modified silicone oil, it is preferable that all of the silicon atoms are bonded only to carbon atoms or oxygen atoms of siloxane linkages. The modified silicone oil is preferably an unreactive silicone oil. The modified silicone oil is preferably composed only of silicon atoms, carbon atoms, oxygen atoms and hydrogen atoms.

Examples of compounds that can be used as the modified silicone oil include compounds in which at least one methyl group within a chain-like or cyclic dimethyl silicone oil has been substituted with one or more groups selected from the group consisting of alkyl groups, carboxylate ester linkage-containing groups, aromatic ring-containing groups, and ether linkage-containing groups.

Examples of other compounds that can be used as the modified silicone oil include compounds in which at least one silicon atom contained in a chain-like or cyclic dimethyl silicone oil has been bonded, via an alkylene group, to a silicon atom of another chain-like or cyclic dimethyl silicone oil. In this case, at least one methyl group contained within the chain-like or cyclic dimethyl silicone oils that are linked via the alkylene group may be substituted with one or more groups selected from the group consisting of alkyl groups, carboxylate ester linkage-containing groups, aromatic ring-containing groups, and ether linkage-containing groups.

Examples of these modified silicone oils include alkyl-modified silicone oils, aryl-modified silicone oils such as phenyl-modified silicone oils and aralkyl-modified silicone oils, carboxylate ester-modified silicone oils, alkylene-modified silicone oils, and polyether-modified silicone oils.

The modified silicone oil preferably contains 2 to 20 silicon atoms, more preferably 2 to 10 silicon atoms, even more preferably 2 to 6 silicon atoms, and most preferably 3 to 6 silicon atoms.

Examples of compounds that can be used as phenyl-modified silicone oils include methyl phenyl silicones such as trimethylsiloxyphenyl dimethicone, phenyl trimethicone, diphenylsiloxyphenyl trimethicone, and 1,1,1,5,5,5-hexamethyl-3-phenyl-3-(trimethylsilyloxy)trisiloxane.

Examples of the modified silicone oil include a silicone oil having 2 to 6 silicon atoms in one molecule, having an organic group in which a carbon atom is bonded directly to a silicon atom and in which the total number of carbon atoms and oxygen atoms is at least 4, and having a total number of carbon atoms and oxygen atoms, contained within all of the organic groups in which the total number of carbon atoms and oxygen atoms is at least 4, that is from 4 to 20 within one molecule. Hereafter, this silicone oil is sometimes referred to as "the modified silicone oil S".

The modified silicone oil S may contain at least one group selected from the group consisting of groups (A) to (D) described below as the organic group in which the total number of carbon atoms and oxygen atoms is at least 4.

(A) Alkyl groups having at least 4 carbon atoms.

(B) Carboxylate ester linkage-containing groups in which the total number of carbon atoms and oxygen atoms is at least 4.

(C) Aromatic ring-containing groups having at least 6 carbon atoms.

(D) Alkylene groups having at least 4 carbon atoms.

It is preferable that the modified silicone oil S has a total number of carbon atoms and oxygen atoms, contained within all of the organic groups in which the total number of carbon atoms and oxygen atoms is at least 4, that is from 4 to 12 within one molecule.

It is preferable that the modified silicone oil S has a total number of carbon atoms and oxygen atoms, contained within all of the organic groups in which the total number of carbon atoms and oxygen atoms is at least 4, that is from 8 to 20 within one molecule.

In those cases where one molecule of the modified silicone oil S contains two or more of the organic groups in which the total number of carbon atoms and oxygen atoms is at least 4, the total number of carbon atoms and oxygen atoms, in one molecule, that are contained within all of the organic groups in which the total number of carbon atoms and oxygen atoms is at least 4 refers to the total number of carbon atoms and oxygen atoms contained in the two or more organic groups each having a total number of carbon atoms and oxygen atoms of at least 4.

Examples of the modified silicone oil S include silicone oils represented by general formula (X) shown below.

General formula (X)

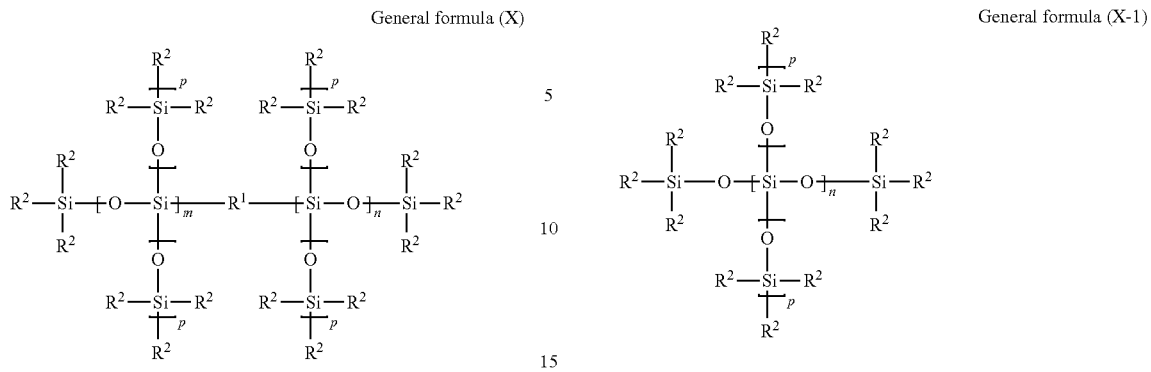

In general formula (X), $R^1$ represents an oxygen atom or a divalent organic group having a carbon atom bonded directly to a silicon atom, each $R^2$ independently represents a monovalent organic group having a carbon atom bonded directly to a silicon atom, each of m and n independently represents an integer of 0 to 4, each p independently represents an integer of 0 to 2, the number of silicon atoms within one molecule is from 2 to 6, at least one of $R^1$ and $R^2$ is an organic group in which the total number of carbon atoms and oxygen atoms is at least 4, and the total number of carbon atoms and oxygen atoms, contained within all of the organic groups in which the total number of carbon atoms and oxygen atoms is at least 4, is from 4 to 20 within one molecule.

In general formula (X), it is preferable that $R^1$ is an oxygen atom, or a divalent organic group in which the total number of carbon atoms and oxygen atoms is at least 4, and each $R^2$ independently represents a methyl group, or a monovalent organic group in which the total number of carbon atoms and oxygen atoms is at least 4.

It is preferable that in general formula (X), $R^1$ is an oxygen atom or an alkylene group having at least 4 carbon atoms, and each $R^2$ independently represents a methyl group, an alkyl group having at least 4 carbon atoms, a carboxylate ester linkage-containing group in which the total number of carbon atoms and oxygen atoms is at least 4, or an aromatic ring-containing group having at least 6 carbon atoms, wherein at least one of $R^1$ and $R^2$ is a group selected from the group consisting of alkylene groups having at least 4 carbon atoms, alkyl groups having at least 4 carbon atoms, carboxylate ester linkage-containing groups in which the total number of carbon atoms and oxygen atoms is at least 4, and aromatic ring-containing groups having at least 6 carbon atoms, and the total number of carbon atoms and oxygen atoms in one molecule that are contained within all of the alkylene groups having at least 4 carbon atoms, alkyl groups having at least 4 carbon atoms, carboxylate ester linkage-containing groups in which the total number of carbon atoms and oxygen atoms is at least 4, and aromatic ring-containing groups having at least 6 carbon atoms, is from 4 to 20.

Other examples of the modified silicone oil S include silicone oils represented by general formula (X-1) shown below.

General formula (X-1)

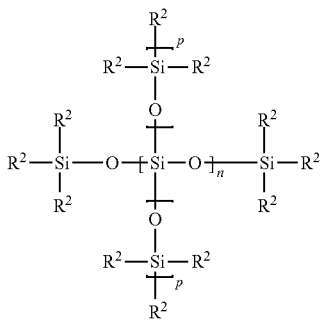

In general formula (X-1), each $R^2$ independently represents a monovalent organic group having a carbon atom bonded directly to a silicon atom, n represents an integer of 0 to 4, each p independently represents 0 or 1, the number of silicon atoms within one molecule is from 2 to 6, at least one $R^2$ is an organic group in which the total number of carbon atoms and oxygen atoms is at least 4, and the total number of carbon atoms and oxygen atoms, contained within all of the organic groups in which the total number of carbon atoms and oxygen atoms is at least 4, is from 4 to 20 within one molecule.

In general formula (X-1), it is preferable that each $R^2$ independently represents a methyl group or a monovalent organic group in which the total number of carbon atoms and oxygen atoms is at least 4.

In general formula (X-1), at least one $R^2$ is preferably at least one group selected from the group consisting of alkyl groups having at least 4 carbon atoms, carboxylate ester linkage-containing groups in which the total number of carbon atoms and oxygen atoms is at least 6, and aromatic ring-containing groups having at least 6 carbon atoms.

In the modified silicone oil S, the alkyl group having at least 4 carbon atoms may have a straight chain or a branched chain, and may be chain-like or alicyclic.

The number of carbon atoms in this alkyl group is preferably at least 4, more preferably at least 6, even more preferably at least 8, and even more preferably 10 or greater.

The number of carbon atoms in this alkyl group may be, for example, not more than 20, preferably not more than 18, more preferably not more than 16, and even more preferably 12 or fewer.

Examples of the alkyl group having at least 4 carbon atoms include an n-butyl group, isobutyl group, tert-butyl group, pentyl group, hexyl group, heptyl group, octyl group, isooctyl group, nonyl group, decyl group, dodecyl group, tetradecyl group, hexadecyl group and octadecyl group.

Preferred groups include an octyl group, decyl group, dodecyl group and hexadecyl group, and a decyl group or dodecyl group is more preferred.

For example, a compound represented by general formula (1) shown below can be used as the modified silicone oil S having an alkyl group.

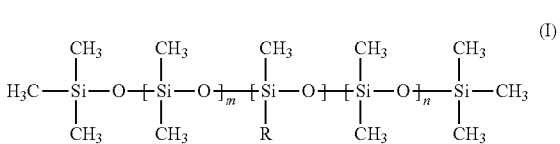

In general formula (1), R represents an alkyl group having 4 to 20 carbon atoms which has a straight chain or a branched chain, and each of m and n independently represents an integer of 0 to 2, provided that m+n≤2.

In general formula (1), R represents an alkyl group having 4 to 20 carbon atoms which has a straight chain or a branched chain. The number of carbon atoms in the alkyl group represented by R is preferably at least 4, more preferably at least 6, even more preferably at least 8, and even more preferably 10 or greater.

The number of carbon atoms in the alkyl group represented by R is preferably not more than 20, more preferably not more than 18, even more preferably not more than 16, and even more preferably 12 or fewer.

The compound represented by general formula (1) is preferably the compound shown below, which represents a compound of general formula (1) in which m and n are both 0. In the compound shown below, R is the same as defined above for general formula (1).

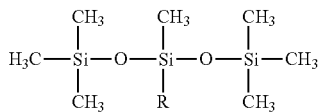

In the modified silicone oil S, for the carboxylate ester linkage-containing group, a group represented by —$R^{Bb}$—O—(CO)—$R^{Ba}$ or a group represented by —$R^{Bb}$—(CO)—O—$R^{Ba}$, in which the carboxylate ester linkage is bonded to a silicon atom of the main-chain siloxane linkage via an alkylene group, can be used particularly favorably.

Here, $R^{Ba}$ is preferably a chain-like or alicyclic alkyl group having at least 1 carbon atom which may have a straight chain or branched chain. $R^{Bb}$ is preferably a chain-like or alicyclic alkylene group having at least 1 carbon atom which may have a straight chain or branched chain. The alkylene group linking the silicon atom of the main-chain siloxane linkage and the carboxylate ester linkage more preferably has at least 2 carbon atoms.

The total number of carbon atoms and oxygen atoms in the carboxylate ester linkage-containing group is the total of the one carbon atom and two oxygen atoms in the ester linkage (—O—(CO)—), the number of carbon atoms in the alkyl group ($R^{Ba}$), and the number of carbon atoms in the alkylene group ($R^{Bb}$).

In the carboxylate ester linkage-containing group, examples of the alkyl group ($R^{Ba}$) include a methyl group, ethyl group, propyl group, isopropyl group, n-butyl group, isobutyl group, tert-butyl group, pentyl group, hexyl group, heptyl group, octyl group, isooctyl group, nonyl group, decyl group, dodecyl group, hexadecyl group and heptadecyl group.

Preferred alkyl groups include a pentyl group, heptyl group, nonyl group and tridecyl group, and a heptyl group or nonyl group is particularly preferred.

In the carboxylate ester linkage-containing group, the alkylene group ($R^{Bb}$) is preferably a linear alkylene group having 1 to 8 carbon atoms, and examples include a methylene group, ethylene group, propylene group, trimethylene group, n-butylene group, isobutylene group, pentylene group, hexylene group, heptylene group, octylene group and isooctylene group.

An ethylene group is preferred.

Examples of compounds that can be used favorably as the modified silicone oil S having a carboxylate ester linkage-containing group include compounds of the above general formula (X-1) in which each $R^2$ independently represents a methyl group or a carboxylate ester linkage-containing group in which a carbon atom is bonded directly to a silicon atom and in which the total number of carbon atoms and oxygen atoms is at least 4, n represents an integer of 0 to 4, each p independently represents 0 or 1, the number of silicon atoms within one molecule is from 2 to 6, at least one $R^2$ is an aforementioned carboxylate ester linkage-containing group, and the total number of carbon atoms and oxygen atoms contained within all of the carboxylate ester linkage-containing groups within one molecule is from 4 to 20.

In the modified silicone oil S, for the aromatic ring-containing group, a group represented by —$R^{Ca}$ in which the aromatic ring is bonded directly to a silicon atom of the main-chain siloxane linkage, or a group represented by —$R^{Cb}$—$R^{Ca}$, in which the aromatic ring is bonded to a silicon atom of the main-chain siloxane linkage via an alkylene group, can be used favorably.

Here, $R^{Ca}$ is preferably an aromatic ring having at least 6 carbon atoms. $R^{Cb}$ is preferably a chain-like or alicyclic alkylene group having at least 1 carbon atom which may have a straight chain or branched chain.

When the aromatic ring-containing group is a group represented by —$R^{Ca}$ in which the aromatic ring is bonded directly to a silicon atom of the main-chain siloxane linkage, it is preferable that a branched chain such as a trimethylsilyloxy group branches from the main-chain siloxane linkage as a side chain. It is more preferable that the aromatic ring-containing group is a group represented by —$R^{Cb}$—$R^{Ca}$, in which the aromatic ring is bonded to a silicon atom of the main-chain siloxane linkage via an alkylene group.

The number of carbon atoms in the aromatic ring-containing group is the total of the number of carbon atoms in the aromatic ring ($R^{Ca}$) and the number of carbon atoms in the optional alkylene group ($R^{Cb}$).

In the aromatic ring-containing group, examples of the aromatic ring portion ($R^{Ca}$) include a phenyl group, tolyl group, xylyl group, trimethylphenyl group, biphenylyl group, naphthyl group or anthracenyl group, or a functional group in which at least one hydrogen atom of one of these groups has been substituted with an alkyl group.

In the aromatic ring-containing group, the optional alkylene group ($R^{Cb}$) is preferably an alkylene group having 1 to 8 carbon atoms that may have a straight chain or a branched chain, and examples include a methylene group, ethylene group, propylene group, trimethylene group, n-butylene group, isobutylene group, pentylene group, hexylene group, heptylene group, octylene group and isooctylene group.

A propylene group, methylethylene group or ethylene group is preferred.

Examples of compounds that can be used favorably as the modified silicone oil S having an aromatic ring-containing group include compounds of the above general formula (X-1) in which each $R^2$ independently represents a methyl group or an aromatic ring-containing group having at least 6 carbon atoms in which a carbon atom is bonded directly to a silicon atom, n represents an integer of 0 to 4, each p independently represents 0 or 1, the number of silicon atoms within one molecule is from 2 to 6, at least one $R^2$ is an aforementioned aromatic ring-containing group, and the total number of carbon atoms contained within all of the aromatic ring-containing groups within one molecule is from 6 to 20.

One embodiment of the modified silicone oil S is a compound having 2 to 6 silicon atoms and an alkylene group having at least 4 carbon atoms, and is preferably a compound in which a silyl group or at least one siloxane linkage is bonded to the carbon atom at each of the two terminals of an alkylene group having at least 4 carbon atoms.

Examples of the alkylene group having at least 4 carbon atoms include an n-butylene group, isobutylene group, pentylene group, hexylene group, heptylene group, octylene group, isooctylene group, nonylene group, decylene group, dodecylene group, hexadecylene group and eicosylene group.

An octylene group, decylene group or dodecylene group is preferred, and an octylene group or decylene group is more preferred.

Examples of compounds that can be used favorably as the modified silicone S having an alkylene group include compounds of the above general formula (X) in which $R^1$ represents an alkylene group having at least 4 carbon atoms, $R^2$ represents a methyl group, each of m and n independently represents an integer of 0 to 4, each p independently represents an integer of 0 to 2, and the number of silicon atoms within one molecule is from 2 to 6.

The modified silicone oil S described above can be produced using the method described below, but the invention is not restricted to this particular method.

For example, the modified silicone oil S can be obtained by reacting a siloxane raw material with a reactive compound having both an organic group in which the total number of carbon atoms and oxygen atoms is at least 4 and a reactive group, in an organic solvent. The siloxane raw material and the reactive compound are preferably reacted so that the molar ratio between the reactive groups of the siloxane raw material and the reactive groups of the reactive compound is within a range from 1:1 to 1:1.5. Further, during the reaction, a catalyst such as a platinum catalyst like a zero-valent platinum olefin complex, a zero-valent platinum vinylsiloxane complex, a divalent platinum olefin complex halide or platinic chloride can be used favorably.

Examples of compounds that can be used as the siloxane raw material include 1,1,1,3,3-pentamethyldisiloxane, 1,1,1,3,5,5,5-heptamethyltrisiloxane, 1,1,1,3,3,5,7,7,7-nonamethyltetrasiloxane, 1,1,1,3,3,5,7,7,9,9,9-undecamethylpentasiloxane, pentamethyldisiloxane, 1,1,3,3,5,5,5-heptamethyltrisiloxane, 1,1,3,3,-tetramethyldisiloxane, 1,1,3,3,5,5-hexamethyltrisiloxane, 1,1,3,3,5,5,7,7-octamethyltetrasiloxane, 1,1,3,3,5,5,7,7,9,9-decamethylpentasiloxane, 1,1,1,5,5,5-hexamethyl-3-(trimethylsilyloxy)trisiloxane, 1,1,1,5,5,5-hexamethyltrisiloxane, 1,1,1,3,5,7,7,7-octamethyltetrasiloxane, 1,1,3,5,5-pentamethyl-3-(dimethylsilyloxy)trisiloxane, and 1,1,3,3,5,5,7,7,9,9,11,11-dodecamethylhexasiloxane.

The reactive compound preferably contains a carbon double bond as the reactive group.

Examples of reactive compounds that can be used for introducing an alkyl group into the modified silicone oil S include alkenes having at least 4 carbon atoms, such as 1-butene, 2-butene, 1-pentene, 1-hexene, 1-heptene, 1-octene, 2-octene, 1-nonene, 1-decene, 1-dodecene, 1-tetradecene, 1-hexadecene and 1-eicosene.

Further, besides alkenes, alicyclic hydrocarbons having an ethylenic unsaturated double bond such as vinylcyclohexane can also be used.

Examples of reactive compounds that can be used for introducing an ester linkage-containing group into the modified silicone oil S include vinyl esters of aliphatic acids and allyl esters of aliphatic acids in which the total number of carbon atoms and oxygen atoms is at least 6, such as vinyl acetate, vinyl propionate, vinyl butyrate, vinyl isobutanoate, vinyl pentanoate, vinyl pivalate, vinyl hexanoate, vinyl heptanoate, vinyl 2-ethylhexanoate, vinyl octanoate, vinyl isooctanoate, vinyl nonanoate, vinyl decanoate, vinyl laurate, vinyl myristate, vinyl palmitate, vinyl eicosanoate and allyl hexanoate.

Examples of reactive compounds that can be used for introducing an aromatic ring-containing group into the modified silicone oil S include aryl compounds having a vinyl bond and an aromatic ring of at least 6 carbon atoms, such as styrene, 4-methylstyrene, 2-methylstyrene, 4-tert-butylstyrene, allylbenzene, 1-allylnaphthalene, 4-phenyl-1-butene, 2,4-diphenyl-4-methyl-1-pentene, 1-vinylnaphthalene, α-methylstyrene, 2-methyl-1-phenylpropene, 1,1-diphenylethylene, triphenylethylene, 2,4,6-trimethylstyrene, cis-β-methylstyrene, trans-β-methylstyrene, and 3-phenyl-1-propene.

Examples of reactive compounds that can be used for introducing an alkylene group into the modified silicone oil S include diene compounds having at least 4 carbon atoms, such as 1,3-butadiene, 1,3-pentadiene, 1,4-pentadiene, 1,5-hexadiene, 1,6-heptadiene, 1,7-octadiene, 1,8-nonadiene, 1,9-decadiene, 1,11-dodecadiene, 1,10-undecadiene, 1,13-tetradecadiene, hexadecadiene, and eicosadiene.

Commercially available products may be used as the silicone oil, and examples of products that may be used include "KF-96L-5CS" and "KF-56A" manufactured by Shin-Etsu Chemical Co., Ltd., "DC246 Fluid", "DC345 Fluid", "FZ-3196" and "SS-3408" manufactured by Dow Corning Toray Co., Ltd., and 1,1,1,5,5,5-hexamethyl-3-phenyl-3-(trimethylsilyloxy)trisiloxane, decamethylcyclopentasiloxane and dodecamethylcyclohexasiloxane manufactured by Tokyo Chemical Industry Co., Ltd.

A single silicone oil having a surface tension of at least 19.0 mN/m but less than 24.0 mN/m may be used alone, or two or more thereof may be used in combination.

From the viewpoints of further enhancing the effects of the ink in reducing show-through and reducing roller transfer contamination, the amount of the silicone oil having a surface tension of at least 19.0 mN/m but less than 24.0 mN/m, relative to the total mass of non-aqueous solvents within the ink, is preferably at least 5% by mass, more preferably at least 10% by mass, even more preferably at least 15% by mass, and even more preferably 20% by mass or greater.

The amount of the silicone oil having a surface tension of at least 19.0 mN/m but less than 24.0 mN/m, relative to the total mass of non-aqueous solvents within the ink, may be, for example, not more than 90% by mass, not more than 80% by mass, not more than 70% by mass, or 60% by mass or less.

The amount of the silicone oil having a surface tension of at least 19.0 mN/m but less than 24.0 mN/m relative to the total mass of the ink varies depending on the total amount of the non-aqueous solvent used, but from the viewpoints of further enhancing the effects of the ink in reducing show-through and reducing roller transfer contamination, the amount of the silicone oil is preferably at least 5% by mass, more preferably at least 10% by mass, even more preferably at least 15% by mass, and even more preferably 20% by mass or greater.

The amount of the silicone oil having a surface tension of at least 19.0 mN/m but less than 24.0 mN/m relative to the total mass of the ink may be, for example, not more than 80% by mass, not more than 70% by mass, not more than 60% by mass, or 55% by mass or less.

The ink preferably contains a polar solvent having a surface tension of at least 27.0 mN/m. This makes it easier to improve the image density and to reduce mist generation.

The surface tension of this polar solvent is preferably at least 27.0 mN/m, and more preferably 30.0 mN/m or greater.

Further, the surface tension of the polar solvent having a surface tension of at least 27.0 mN/m is preferably not more than 40.0 mN/m, and more preferably 35.0 mN/m or less.

The polar solvent having a surface tension of at least 27.0 mN/m is preferably a compound that is liquid at 23° C.

Examples of compounds that may be used as the polar solvent having a surface tension of at least 27.0 mN/m include ester-based solvents (including fatty acid ester-based solvents such as fatty acid mono-, di- and tri-esters, as well as ester-based solvents of monobasic, dibasic and tribasic acids other than fatty acids), higher alcohol-based solvents, higher fatty acid-based solvents, and glycol ether-based solvents (such as glycol monoalkyl ethers and glycol dialkyl ethers) that have a surface tension of 27.0 mN/m.

Among the various alcohol-based solvents, higher alcohol-based solvents generally have a polarity that is not as high as that of lower alcohol-based solvents such as ethanol, and therefore exhibit superior stability.

Examples of the polar solvent having a surface tension of at least 27.0 mN/m include fatty acid ester-based solvents having preferably at least 13 carbon atoms, and more preferably 15 to 30 carbon atoms, within one molecule, such as isotridecyl isononanoate, methyl laurate, isopropyl laurate, hexyl laurate, isopropyl myristate, isopropyl palmitate, hexyl palmitate, isooctyl palmitate, isostearyl palmitate, methyl oleate, ethyl oleate, isopropyl oleate, butyl oleate, hexyl oleate, methyl linoleate, ethyl linoleate, isobutyl linoleate, butyl stearate, hexyl stearate, isooctyl stearate, isopropyl isostearate, 2-octyldecyl pivalate, neopentyl glycol diethylhexanoate, methyl soybean oil, isobutyl soybean oil, methyl tallate and isobutyl tallate;

higher alcohol-based solvents having at least 6 carbon atoms, preferably 10 to 20 carbon atoms, and more preferably 12 to 20 carbon atoms, within each molecule, such as decanol, tetradecanol, hexanol, 2-ethylhexanol, isostearyl alcohol, isomyristyl alcohol, isopalmityl alcohol, oleyl alcohol, isoeicosyl alcohol and decyltetradecanol;

higher fatty acid-based solvents having at least 12 carbon atoms, and preferably 14 to 20 carbon atoms, within one molecule, such as lauric acid, isomyristic acid, palmitic acid, isopalmitic acid, α-linolenic acid, linoleic acid, oleic acid and isostearic acid; and glycol ether-based solvents such as tetraethylene glycol dimethyl ether and triethylene glycol monobutyl ether.

The boiling point of the polar solvent having a surface tension of at least 27.0 mN/m is preferably at least 150° C., more preferably at least 200° C., and even more preferably 250° C. or higher. These non-aqueous solvents having a boiling point of 250° C. or higher also include non-aqueous solvents that do not exhibit an actual boiling point.

A single polar solvent having a surface tension of at least 27.0 mN/m may be used alone, or two or more thereof may be used in combination.

From the viewpoints of enhancing the image density improvement effect and the mist generation reduction effect, the amount of the polar solvent having a surface tension of at least 27.0 mN/m, relative to the total mass of non-aqueous solvents in the ink, is preferably at least 5% by mass, more preferably at least 10% by mass, even more preferably at least 15% by mass, and even more preferably 20% by mass or greater.

The amount of the polar solvent having a surface tension of at least 27.0 mN/m relative to the total mass of non-aqueous solvents in the ink may be, for example, not more than 80% by mass, not more than 70% by mass, not more than 60% by mass, or 55% by mass or less.

The amount of the polar solvent having a surface tension of at least 27.0 mN/m relative to the total mass of the ink varies depending on the total amount of the non-aqueous solvent used, but from the viewpoints of further enhancing the image density improvement effect and the mist generation reduction effect, the amount of the polar solvent is preferably at least 5% by mass, more preferably at least 10% by mass, even more preferably at least 15% by mass, and most preferably 20% by mass or greater.

The amount of the polar solvent having a surface tension of at least 27.0 mN/m relative to the total mass of the ink is, for example, typically not more than 70% by mass, not more than 60% by mass, or not more than 55% by mass, and may be 50% by mass or less.

The ink may also contain other non-aqueous solvents.

Both non-polar organic solvents and polar organic solvents having a surface tension of less than 27.0 mN/m can be used as these other non-aqueous solvents. In the embodiments of the present invention, a water-insoluble organic solvent that does not mix uniformly with an equal volume of water at 1 atmosphere and 20° C. is preferably used as this other non-aqueous solvent.

Examples of preferred non-polar organic solvents include petroleum-based hydrocarbon solvents such as aliphatic hydrocarbon solvents, alicyclic hydrocarbon solvents and aromatic hydrocarbon solvents.

Examples of the aliphatic hydrocarbon solvents and alicyclic hydrocarbon solvents include paraffin-based, isoparaffin-based, and naphthene-based non-aqueous solvents. Specific examples of preferred commercially available products include No. 0 Solvent L, No. 0 Solvent M, No. 0 Solvent H, Cactus Normal Paraffin N-10, Cactus Normal Paraffin N-11, Cactus Normal Paraffin N-12, Cactus Normal Paraffin N-13, Cactus Normal Paraffin N-14, Cactus Normal Paraffin N-15H, Cactus Normal Paraffin YHNP, Cactus Normal Paraffin SHNP, Isosol 300, Isosol 400, Teclean N-16, Teclean N-20, Teclean N-22, AF Solvent No. 4, AF Solvent No. 5, AF Solvent No. 6, AF Solvent No. 7, Naphtesol 160, Naphtesol 200 and Naphtesol 220 (all manufactured by JXTG Nippon Oil & Energy Corporation); Isopar G, Isopar H, Isopar L, Isopar M, Exxsol D40, Exxsol D60, Exxsol D80, Exxsol D95, Exxsol D110 and Exxsol D130 (all manufactured by Exxon Mobil Corporation); and MORESCO White P-40, MORESCO White P-60, MORESCO White P-70, MORESCO White P-80, MORESCO White P-100, MORESCO White P-120, MORESCO White P-150, MORESCO White P-200, MORESCO White P-260 and MORESCO White P-350P (all manufactured by MORESCO Corporation).

Examples of preferred aromatic hydrocarbon solvents include Grade Alkene L and Grade Alkene 200P (both manufactured by JXTG Nippon Oil & Energy Corporation), and Solvesso 100, Solvesso 150, Solvesso 200 and Solvesso 200ND (manufactured by Exxon Mobil Corporation).

The initial boiling point of the petroleum-based hydrocarbon solvent is preferably at least 100° C., more preferably at least 150° C., and even more preferably 200° C. or higher. The initial boiling point can be measured in accordance with JIS K0066 "Test Methods for Distillation of Chemical Products".

Examples of the polar organic solvents having a surface tension of less than 27.0 mN/m include aliphatic acid ester-based solvents such as isononyl isononanoate, isodecyl isononanoate and ethyl 2-methylpentanoate.

The boiling point of these polar organic solvents is preferably at least 150° C., more preferably at least 200° C., and even more preferably 250° C. or higher. These non-aqueous solvents having a boiling point of 250° C. or higher also include non-aqueous solvents that do not exhibit an actual boiling point.

These non-aqueous solvents may be used individually, or a combination of two or more solvents may be used, provided the solvents form a single phase.

In addition to the various components described above, the oil-based ink may also include various additives, provided these additives do not impair the effects of the present invention. For example, additives such as nozzle blockage inhibitors, antioxidants, conductivity modifiers, viscosity modifiers, surface tension regulators, and oxygen absorbers and the like may be added as appropriate. There are no particular limitations on these additives, and materials typically used in this technical field may be used.

The ink can be produced by mixing the various components including the colorant and the non-aqueous solvent. The ink is preferably produced by mixing and stirring the components together, either in a single batch or in a number of separate batches. Specifically, the ink can be produced by dispersing all of the components in a dispersion device such as a beads mill, either in a single batch or in a number of separate batches, and then, if desired, passing the resulting dispersion through a filtration device such as a membrane filter.

The surface tension of the ink is preferably at least 23.0 mN/m, and more preferably 24.0 mN/m or greater. This may facilitate a reduction in mist generation.

The surface tension of the ink is preferably less than 27.0 mN/m, and more preferably less than 26.0 mN/m. This tends to increase the dot diameter, making it easier to achieve higher image density.

The surface tension of the ink is preferably at least 23.0 mN/m but less than 27.0 mN/m, and is more preferably at least 24.0 mN/m but less than 26.0 mN/m.

The ideal range for the viscosity of the oil-based inkjet ink varies depending on factors such as the diameter of the nozzles within the discharge head of the inkjet recording system and the discharge environment, but generally, the viscosity at 23° C. is preferably within a range from 5 to 30 mPa·s, more preferably from 5 to 15 mPa·s, and even more preferably about 10 mPa·s.

There are no particular limitations on the printing method used with the inkjet ink, and any of various printing systems, including a piezo system, electrostatic system or thermal system may be used, but a piezo system is preferred. In those cases where an inkjet recording device is used, the ink of the present invention is preferably discharged from the inkjet head based on a digital signal, with the discharged ink droplets being adhered to a recording medium.

In the embodiments of the present invention, there are no particular limitations on the recording medium, and examples of media that can be used include printing papers such as plain papers, coated papers and specialty papers, cloth, inorganic sheets, films and OHP sheets, and adhesive sheets having one of the above media as a base material and having an adhesive layer provided on the rear surface. Among these, from the viewpoint of ink penetration, a printing paper such as a plain paper or a coated paper can be used favorably.

Here, plain paper describes a normal paper in which an ink receiving layer or film layer or the like has not been formed on the surface of the paper. Examples of plain papers include high-quality papers, medium-quality papers, PPC papers, woody papers and recycled papers. In a plain paper, paper fibers with a thickness of several m to several tens of m are formed with a spacing between fibers of several tens to several hundred m, and therefore the ink can penetrate readily.

Further, in terms of coated papers, coated papers designed for inkjets, such as matte papers, glossy papers and semi-glossy papers, and other so-called coated printing papers can be used favorably. A coated printing paper describes the type of paper that has conventionally been used in relief printing, offset printing, and gravure printing and the like, and is a printing paper in which a coating layer is formed on the surface of a high-quality paper or medium-quality paper using a coating material containing an inorganic pigment such as clay or calcium carbonate and a binder such as starch. Depending on the amount applied of the coating material and the coating method used, coated printing papers are classified into fine coated papers, high-quality lightweight coated papers, medium-quality lightweight coated papers, high-quality coated papers, medium-quality coated papers, art papers, and cast coated papers and the like.

EXAMPLES

The present invention is described below in further detail using a series of examples. The present invention is in no way limited by the following examples.

[Syntheses of Modified Silicones 2 to 4]

The formulations of modified silicones 2 to 4 are shown in Table 1. The modified silicone 2 was synthesized in the following manner.

A four-necked flask was charged with 50 parts by mass of hexane, 10 parts by mass of 1,1,1,3,5,5,5-heptamethyltrisiloxane, and 9.7 parts by mass of 1-tetradecene. Subsequently, 0.02 parts by mass of a platinum catalyst (1,3-divinyl-1,1,3,3-tetramethyldisiloxane platinum complex, manufactured by Sigma-Aldrich Corporation) was added dropwise to the flask, and the resulting mixture was stirred at room temperature for 2 to 3 hours. The reaction solvent (hexane) and any unreacted raw materials were then removed by distillation under reduced pressure to obtain the target substance.

With the exception of mixing the siloxane compound and the reactive compound in the formulations shown in Table 1, the modified silicones 3 and 4 were synthesized in a similar manner to above.

In the synthesis of each of the modified silicones 2 to 4, mixing was performed so that the molar ratio between the siloxane compound and the reactive compound was 1:1.1.

The 1,1,1,3,5,5,5-heptamethyltrisiloxane, the 1,1,1,3,3-pentamethyldisiloxane and the reactive compounds shown in Table 1 can be obtained from Tokyo Chemical Industry Co., Ltd.

TABLE 1

| | Siloxane compound Raw material | (parts by mass) Amount | Reactive compound Raw material | (parts by mass) Amount |
|---|---|---|---|---|
| Modified silicone 2 | 1,1,1,3,5,5,5-heptamethyltrisiloxane | 10 | 1-tetradecene | 9.7 |
| Modified silicone 3 | 1,1,1,3,3-pentamethyldisiloxane | 10 | 1-dodecene | 12.5 |
| Modified silicone 4 | 1,1,1,3,5,5,5-heptamethyltrisiloxane | 10 | 1-eicosene | 13.9 |

<Preparation of Inks>

Ink formulations are shown in Tables 2 to 5.

The pigments, pigment dispersants, and the various solvents shown in each of the tables were mixed together in accordance with the amounts shown in each table, and the pigment was dispersed thoroughly using a beads mill (Dyno-Mill KDL-A, manufactured by Shinmaru Enterprises Corporation) under conditions including a residence time of 15 minutes. Subsequently, coarse particles were removed with a membrane filter to obtain the ink.

The surface tension of each ink and each solvent shown in Tables 2 to 5 was determined using a Science Line t60 device manufactured by SITA Process Solutions of SITA Messtechnik GmbH, under measurement conditions of 23° C. and 0.05 Hz.

The materials used were as follows.

(Pigments)

Carbon black 1: MA77, manufactured by Mitsubishi Chemical Corporation

Carbon black 2: NEROX500, manufactured by Evonik Japan Co., Ltd.

(Pigment Dispersants)

Solsperse 18000: manufactured by The Lubrizol Corporation (effective component: 100% by mass)

Solsperse 13940: manufactured by The Lubrizol Corporation (effective component: 40% by mass)

(Silicone Oils)

Chain-like silicone 1: KF96L-2CS, a dimethyl silicone oil, manufactured by Shin-Etsu Chemical Co., Ltd.

Chain-like silicone 2: KF96L-5CS, a dimethyl silicone oil, manufactured by Shin-Etsu Chemical Co., Ltd.

Modified silicone 1: FZ-3196, an alkyl-modified silicone oil (3-octylheptamethyltrisiloxane), manufactured by Dow Corning Toray Co., Ltd.

Modified silicone 2: an alkyl-modified silicone oil (3-tetradecylheptamethyltrisiloxane), manufactured using the method described above Modified silicone 3: an alkyl-modified silicone oil (1-dodecylpentamethyldisiloxane), manufactured using the method described above Modified silicone 4: an alkyl-modified silicone oil (3-eicosylheptamethyltrisiloxane), manufactured using the method described above (Polar Organic Solvents: Ester-Based Solvents)

Ethyl 2-methylpentanoate: manufactured by Toyo Gosei Co., Ltd.

Ethyl oleate: manufactured by Tokyo Chemical Industry Co., Ltd.

Isotridecyl isononanoate: KAK139, manufactured by Kokyu Alcohol Kogyo Co., Ltd.

Neopentyl glycol diethylhexanoate: KAK NDO, manufactured by Kokyu Alcohol Kogyo Co., Ltd.

(Polar Organic Solvents: Alcohol-Based Solvents)

Ethanol: manufactured by Tokyo Chemical Industry Co., Ltd.

Decanol: manufactured by Tokyo Chemical Industry Co., Ltd.

Tetradecanol: manufactured by Tokyo Chemical Industry Co., Ltd.

(Polar Organic Solvents: Glycol Ether-Based Solvents)

Tetraethylene glycol dimethyl ether: manufactured by Tokyo Chemical Industry Co., Ltd.

Triethylene glycol monobutyl ether: manufactured by Tokyo Chemical Industry Co., Ltd.

(Petroleum-Based Hydrocarbon Solvent: Paraffin-Based Solvent)

Hexane: manufactured by Tokyo Chemical Industry Co., Ltd.

(Petroleum-Based Hydrocarbon Solvent: Isoparaffin-Based Solvent)

Isopar M: manufactured by Exxon Mobil Corporation (Petroleum-Based Hydrocarbon Solvent: Naphthene-Based Solvent)

Exxsol D130: manufactured by Exxon Mobil Corporation

<Evaluations>

Each of the inks described above was mounted in a line-type inkjet printer "ORPHIS FW5230" (manufactured by RISO KAGAKU CORPORATION), and printed items were obtained by printing 100 copies of a solid image onto a plain paper "RISO Paper Thin Type" (manufactured by RISO KAGAKU CORPORATION). The printing was performed at a resolution of 300×300 dpi, under discharge conditions including an ink volume per dot of 42 pl.

The ORPHIS FW5230 is a system that uses a line-type inkjet head, wherein the paper is transported in a sub-scanning direction perpendicular to the main scanning direction (the direction along which the nozzles are aligned) while printing is conducted.

The 100th obtained printed item and the inkjet printer following printing of the 100 printed items were evaluated using the methods described below. The results of these evaluations are shown in Tables 2 to 5.

(Roller Transfer Contamination)

The 100th printed item obtained in the manner described above was inspected visually for roller transfer contamination at the boundaries between the solid image portion and the unprinted portion, and the level of roller transfer contamination was evaluated against the following evaluation criteria.

A: almost no contamination is noticeable

B: slight contamination confirmed, but of a level not problematic for actual use C: marked contamination, of a level problematic for actual use (Image Density (Surface Density))

The image density (surface density) of the solid image portion of the 100th printed item obtained in the manner described above was measured after standing for one day, and the measured value was evaluated against the following evaluation criteria. Measurement of the image density was performed using an optical densitometer (RD920, manufactured by Macbeth Corporation).

A: OD value of 1.10 or greater

B: OD value of at least 1.05 but less than 1.10

C: OD value of less than 1.05

(Show-Through (Rear Surface Density))

The OD value of the rear surface side of the solid image portion of the 100th printed item obtained in the manner described above was measured after standing for one day, and the measured value was evaluated against the following evaluation criteria.

A: rear surface OD value of less than 0.15

B: rear surface OD value of at least 0.15 but less than 0.20

C: rear surface OD value of at least 0.20

(Mist Generation)

Mist contamination inside the printer after printing of the 100 solid images was evaluated against the following evaluation criteria.

A: almost no contamination is noticeable

B: slight contamination confirmed, but of a level not problematic for actual use C: marked contamination, of a level problematic for actual use

TABLE 2

| | | | Surface tension [mN/m] | Example 1 | Example 2 | Example 3 | Example 4 | Example 5 |
|---|---|---|---|---|---|---|---|---|
| | Pigments | Carbon black 1 | | 5.00 | 5.00 | 5.00 | 5.00 | |
| | | Carbon black 2 | | | | | | 5.00 |
| | Pigment dispersants | Solsperse 18000 | | 5.00 | 5.00 | 5.00 | 5.00 | |
| | | Solsperse 13940 | | | | | | 5.00 |
| | Silicone oils | Chain-like silicone 1 | 18.3 | | | | | |
| | | Chain-like silicone 2 | 19.7 | 50.00 | | | | |
| | | Modified silicone 1 | 20.7 | | 50.00 | | | 50.00 |
| | | Modified silicone 2 | 22.9 | | | 50.00 | | |
| | | Modified silicone 3 | 23.5 | | | | 50.00 | |
| | | Modified silicone 4 | 24.5 | | | | | |
| Polar solvents | Ester-based solvents | Ethyl 2-methylpentanoate | 26.3 | | | | | |
| | | Ethyl oleate | 31.0 | 40.00 | 40.00 | 40.00 | 40.00 | 40.00 |
| | | Isotridecyl isononanoate | 29.3 | | | | | |
| | | Neopentyl glycol diethylhexanoate | 31.3 | | | | | |
| | Alcohol-based solvents | Ethanol | 22.3 | | | | | |
| | | Decanol | 29.5 | | | | | |
| | | Tetradecanol | 30.8 | | | | | |
| | Glycol ether-based solvents | Tetraethylene glycol dimethyl ether | 29.0 | | | | | |
| | | Triethylene glycol monobutyl ether | 34.6 | | | | | |
| Petroleum-based hydrocarbon solvents | Paraffin-based solvent | Hexane | 20.3 | | | | | |
| | Isoparaffin-based solvent | Isopar M | 25.0 | | | | | |
| | Naphthene-based solvent | Exxsol D130 | 28.0 | | | | | |
| | | Total (% by mass) | | 100.00 | 100.00 | 100.00 | 100.00 | 100.00 |
| | | Ink surface tension [mN/m] | | 24.3 | 24.8 | 25.9 | 26.2 | 24.8 |
| | | Roller transfer contamination | | A | A | A | B | A |
| | | Image density (surface density) | | A | A | A | B | A |
| | | Show-through | | B | A | A | A | A |
| | | Mist generation | | A | A | A | A | A |

TABLE 3

| | | | Surface tension [mN/m] | Example 6 | Example 7 | Example 8 | Example 9 | Example 10 | Example 11 |
|---|---|---|---|---|---|---|---|---|---|
| | Pigments | Carbon black 1 | | 5.00 | 5.00 | 5.00 | 5.00 | 5.00 | 5.00 |
| | | Carbon black 2 | | | | | | | |
| | Pigment dispersants | Solsperse 18000 | | 5.00 | 5.00 | 5.00 | 5.00 | 5.00 | 5.00 |
| | | Solsperse 13940 | | | | | | | |
| | Silicone oils | Chain-like silicone 1 | 18.3 | | | | | | |
| | | Chain-like silicone 2 | 19.7 | | | | | | |
| | | Modified silicone 1 | 20.7 | 50.00 | 50.00 | 50.00 | 50.00 | 50.00 | 50.00 |
| | | Modified silicone 2 | 22.9 | | | | | | |
| | | Modified silicone 3 | 23.5 | | | | | | |
| | | Modified silicone 4 | 24.5 | | | | | | |
| Polar solvents | Ester-based solvents | Ethyl 2-methylpentanoate | 26.3 | | | | | | |
| | | Ethyl oleate | 31.0 | | | | | | |
| | | Isotridecyl isononanoate | 29.3 | 40.00 | | | | | |
| | | Neopentyl glycol diethylhexanoate | 31.3 | | 40.00 | | | | |
| | Alcohol-based solvents | Ethanol | 22.3 | | | | | | |
| | | Decanol | 29.5 | | | 40.00 | | | |
| | | Tetradecanol | 30.8 | | | | 40.00 | | |
| | Glycol ether-based solvents | Tetraethylene glycol dimethyl ether | 29.0 | | | | | 40.00 | |
| | | Triethylene glycol monobutyl ether | 34.6 | | | | | | 40.00 |
| Petroleum-based hydrocarbon solvents | Paraffin-based solvent | Hexane | 20.3 | | | | | | |
| | Isoparaffin-based solvent | Isopar M | 25.0 | | | | | | |
| | Naphthene-based solvent | Exxsol D130 | 28.0 | | | | | | |
| | | Total (% by mass) | | 100.00 | 100.00 | 100.00 | 100.00 | 100.00 | 100.00 |
| | | Ink surface tension [mN/m] | | 24.1 | 24.9 | 24.2 | 24.7 | 24.0 | 26.2 |
| | | Roller transfer contamination | | A | A | A | A | A | A |
| | | Image density (surface density) | | A | A | A | A | A | B |
| | | Show-through | | A | A | A | A | A | A |
| | | Mist generation | | A | A | A | A | A | A |

TABLE 4

| | | | Surface tension [mN/m] | Example 12 | Example 13 | Example 14 | Example 15 | Example 16 |
|---|---|---|---|---|---|---|---|---|
| | Pigments | Carbon black 1 | | 5.00 | 5.00 | 5.00 | 5.00 | 5.00 |
| | | Carbon black 2 | | | | | | |
| | Pigment dispersants | Solsperse 18000 | | 5.00 | 5.00 | 5.00 | 5.00 | 5.00 |
| | | Solsperse 13940 | | | | | | |
| | Silicone oils | Chain-like silicone 1 | 18.3 | | | | | |
| | | Chain-like silicone 2 | 19.7 | | | | | |
| | | Modified silicone 1 | 20.7 | 50.00 | 50.00 | 50.00 | 20.00 | 60.00 |
| | | Modified silicone 2 | 22.9 | | | | | |
| | | Modified silicone 3 | 23.5 | | | | | |
| | | Modified silicone 4 | 24.5 | | | | | |
| Polar solvents | Ester-based solvents | Ethyl 2-methylpentanoate | 26.3 | | | | | |
| | | Ethyl oleate | 31.0 | 25.00 | 25.00 | | 45.00 | 18.00 |
| | | Isotridecyl isononanoate | 29.3 | | | | | |
| | | Neopentyl glycol diethylhexanoate | 31.3 | | | | | |
| | Alcohol-based solvents | Ethanol | 22.3 | | | | | |
| | | Decanol | 29.5 | | | 25.00 | | |
| | | Tetradecanol | 30.8 | | | | | |
| | Glycol ether-based solvents | Tetraethylene glycol dimethyl ether | 29.0 | | | | | |
| | | Triethylene glycol monobutyl ether | 34.6 | | | | | |
| Petroleum-based hydrocarbon solvents | Paraffin-based solvent | Hexane | 20.3 | | | | | |
| | Isoparaffin-based solvent | Isopar M | 25.0 | 15.00 | | | 25.00 | |
| | Naphthene-based solvent | Exxsol D130 | 28.0 | | 15.00 | 15.00 | | 12.00 |
| | Total (% by mass) | | | 100.00 | 100.00 | 100.00 | 100.00 | 100.00 |
| | Ink surface tension [mN/m] | | | 23.9 | 24.3 | 23.9 | 26.3 | 23.4 |
| | Roller transfer contamination | | | A | A | A | B | A |
| | Image density (surface density) | | | A | A | A | B | B |
| | Show-through | | | A | A | A | A | A |
| | Mist generation | | | B | A | B | A | B |

TABLE 5

| | | | Surface tension [mN/m] | Comparative Example 1 | Comparative Example 2 | Comparative Example 3 | Comparative Example 4 | Comparative Example 5 |
|---|---|---|---|---|---|---|---|---|
| | Pigments | Carbon black 1 | | 5.00 | 5.00 | 5.00 | 5.00 | 5.00 |
| | | Carbon black 2 | | | | | | |
| | Pigment dispersants | Solsperse 18000 | | 5.00 | 5.00 | 5.00 | 5.00 | 5.00 |
| | | Solsperse 13940 | | | | | | |
| | Silicone oils | Chain-like silicone 1 | 18.3 | 50.00 | | | | |
| | | Chain-like silicone 2 | 19.7 | | | | | |
| | | Modified silicone 1 | 20.7 | | | | | |
| | | Modified silicone 2 | 22.9 | | | | | 40.00 |
| | | Modified silicone 3 | 23.5 | | | 50.00 | 75.00 | |
| | | Modified silicone 4 | 24.5 | | 50.00 | | | |
| Polar solvents | Ester-based solvents | Ethyl 2-methylpentanoate | 26.3 | | | 40.00 | | |
| | | Ethyl oleate | 31.0 | 40.00 | 40.00 | | | |
| | | Isotridecyl isononanoate | 29.3 | | | | | |
| | | Neopentyl glycol diethylhexanoate | 31.3 | | | | | |
| | Alcohol-based solvents | Ethanol | 22.3 | | | | 15.00 | |
| | | Decanol | 29.5 | | | | | |
| | | Tetradecanol | 30.8 | | | | | |
| | Glycol ether-based solvents | Tetraethylene glycol dimethyl ether | 29.0 | | | | | |
| | | Triethylene glycol monobutyl ether | 34.6 | | | | | |
| Petroleum-based hydrocarbon solvents | Paraffin-based solvent | Hexane | 20.3 | | | | | |
| | Isoparaffin-based solvent | Isopar M | 25.0 | | | | | |
| | Naphthene-based solvent | Exxsol D130 | 28.0 | | | | | 50.00 |
| | Total (% by mass) | | | 100.00 | 100.00 | 100.00 | 100.00 | 100.00 |
| | Ink surface tension [mN/m] | | | 23.6 | 26.7 | 24.3 | 23.0 | 25.2 |
| | Roller transfer contamination | | | A | C | A | A | A |
| | Image density (surface density) | | | A | B | C | C | A |
| | Show-through | | | C | A | A | A | A |
| | Mist generation | | | B | A | A | B | C |

TABLE 5-continued

| | | Surface tension [mN/m] | Comparative Example 6 | Comparative Example 7 | Comparative Example 8 | Comparative Example 9 |
|---|---|---|---|---|---|---|
| Pigments | Carbon black 1 | | 5.00 | 5.00 | 5.00 | 5.00 |
| | Carbon black 2 | | | | | |
| Pigment dispersants | Solsperse 18000 | | 5.00 | 5.00 | 5.00 | 5.00 |
| | Solsperse 13940 | | | | | |
| Silicone oils | Chain-like silicone 1 | 18.3 | | | | |
| | Chain-like silicone 2 | 19.7 | | | | |
| | Modified silicone 1 | 20.7 | | | 65.00 | |
| | Modified silicone 2 | 22.9 | | | | |
| | Modified silicone 3 | 23.5 | | | | 30.00 |
| | Modified silicone 4 | 24.5 | | | | |
| Polar solvents / Ester-based solvents | Ethyl 2-methylpentanoate | 26.3 | | | | |
| | Ethyl oleate | 31.0 | | | | 60.00 |
| | Isotridecyl isononanoate | 29.3 | 50.00 | 50.00 | | |
| | Neopentyl glycol diethylhexanoate | 31.3 | | | | |
| Alcohol-based solvents | Ethanol | 22.3 | 40.00 | | | |
| | Decanol | 29.5 | | | 25.00 | |
| | Tetradecanol | 30.8 | | | | |
| Glycol ether-based solvents | Tetraethylene glycol dimethyl ether | 29.0 | | | | |
| | Triethylene glycol monobutyl ether | 34.6 | | | | |
| Petroleum-based hydrocarbon solvents / Paraffin-based solvent | Hexane | 20.3 | | 40.00 | | |
| Isoparaffin-based solvent | Isopar M | 25.0 | | | | |
| Naphthene-based solvent | Exxsol D130 | 28.0 | | | | |
| Total (% by mass) | | | 100.00 | 100.00 | 100.00 | 100.00 |
| Ink surface tension [mN/m] | | | 25.6 | 24.8 | 22.8 | 27.7 |
| Roller transfer contamination | | | A | A | A | A |
| Image density (surface density) | | | C | C | A | C |
| Show-through | | | C | C | A | A |
| Mist generation | | | A | A | C | A |

As shown in the tables, each of the inks from the Examples was able to suppress roller transfer contamination, show-through and mist generation, and also yielded images with high image density.

In contrast, in Comparative Example 1 in which the surface tension of the silicone oil was low, show-through could not be suppressed. Further, in Comparative Example 2 in which the surface tension of the silicone oil was high, roller transfer contamination could not be suppressed. Furthermore, in Comparative Examples 3 and 4 in which the surface tension of the polar solvent was low, the image density was low. Moreover, in Comparative Example 5 in which a petroleum-based hydrocarbon solvent having a surface tension of 28.0 mN/m was used rather than a polar solvent, mist generation could not be suppressed. Further, in Comparative Example 6 in which a polar solvent with a comparatively low surface tension of 22.3 mN/m was used rather than a silicone oil, the image density was low and show-through could not be suppressed. Further, in Comparative Example 7 in which a petroleum-based hydrocarbon solvent having a comparatively low surface tension of 20.3 mN/m was used rather than a silicone oil, the image density was low and show-through could not be suppressed. Furthermore, in Comparative Example 8 in which the surface tension of the ink was low, mist generation could not be suppressed. Moreover, in Comparative Example 9 in which the surface tension of the ink was high, the image density was low.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. An oil-based inkjet ink comprising a pigment, a pigment dispersant and a non-aqueous solvent, wherein
   the non-aqueous solvent contains a silicone oil having a surface tension of at least 19.0 mN/m but less than 24.0 mN/m at 23° C. and a polar solvent having a surface tension of at least 27.0 mN/m at 23° C.,
   a surface tension of the ink is at least 23.0 mN/m but less than 27.0 mN/m 23° C., and
   the pigment dispersant is adsorbed directly to a surface of the pigment.

2. The oil-based inkjet ink according to claim 1, wherein an amount of the silicone oil is at least 5% by mass relative to the total mass of the ink.

3. The oil-based inkjet ink according to claim 1, wherein the silicone oil contains a modified silicone oil.

4. The oil-based inkjet ink according to claim 1, wherein an amount of the silicone oil is at least 5% by mass relative to the total mass of the ink, and the silicone oil contains a modified silicone oil.

5. The oil-based inkjet ink according to claim 1, wherein a surface tension of the ink is at least 24.0 mN/m but less than 26.0 mN/m at 23° C.

6. The oil-based inkjet ink according to claim 1, wherein a surface tension of the silicone oil is at least 20.0 mN/m but not more than 23.0 mN/m at 23° C.

7. The oil-based inkjet ink according to claim 1, wherein a surface tension of the polar solvent is at least 30.0 mN/m at 23° C.

8. The oil-based inkjet ink according to claim 1, wherein the polar solvent comprises at least one solvent selected from the group consisting of ester-based solvents, higher alcohol-based solvents, higher fatty acid-based solvents, and glycol ether-based solvents.

9. The oil-based inkjet ink according to claim 3, wherein the modified silicone oil comprises at least one selected from the group consisting of an alkyl-modified silicone oil, an aryl-modified silicone oil, a carboxylate ester-modified silicone oil, and an alkylene-modified silicone oil.

* * * * *